United States Patent
Alsindi et al.

(10) Patent No.: US 8,179,251 B2
(45) Date of Patent: May 15, 2012

(54) METHOD AND NETWORK FOR DETERMINING POSITIONS OF WIRELESS NODES WHILE MINIMIZING PROPAGATION OF POSITIONING ERRORS

(75) Inventors: Nayef Alsindi, Hammad Town (BH); Chunjie Duan, Medfield, MA (US); Jinyun Zhang, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 463 days.

(21) Appl. No.: 12/571,399

(22) Filed: Sep. 30, 2009

(65) Prior Publication Data

US 2011/0074569 A1 Mar. 31, 2011

(51) Int. Cl.
*G08B 1/08* (2006.01)
(52) U.S. Cl. ........... 340/539.1; 340/539.13; 340/539.26; 340/541; 340/5.2; 340/5.6; 340/10.1; 340/10.6; 370/230; 370/252; 370/328; 455/63.1; 455/65; 455/67.11; 455/456.1
(58) Field of Classification Search ............... 340/539.1, 340/539.13, 539.26, 541, 5.2, 5.6, 10.1, 10.6; 370/230, 252, 328; 455/63.1, 65, 67.11, 455/456.1
See application file for complete search history.

(56) References Cited

U.S. PATENT DOCUMENTS

| | | | |
|---|---|---|---|
| 2005/0143100 A1* | 6/2005 | Shi et al. | 455/456.6 |
| 2005/0228613 A1 | 10/2005 | Fullerton | |
| 2007/0049291 A1* | 3/2007 | Kim et al. | 455/456.1 |
| 2008/0232281 A1 | 9/2008 | Pahlavan | |
| 2011/0007650 A1* | 1/2011 | Nam et al. | 370/252 |

* cited by examiner

*Primary Examiner* — Tai T Nguyen
(74) *Attorney, Agent, or Firm* — Dirk Brinkman; Gene Vinokur

(57) ABSTRACT

A wireless sensor network includes an initial set of anchors at known locations, and a set of sensors at unknown locations. Ranges, from each sensor to at least three of the anchors, determine a position, an anchor ranging weight, and an anchor position weight. For each anchor, the anchor ranging weight and the anchor position weight form a combined weight. A weighted least square (WLS) function for the positions and the combined weights is minimized to determine a position of the sensor, and a sensor position weight. The sensor is identified as being a member of a set of candidate anchor nodes, and the candidate anchor node with a largest sensor position weight is selected to be transformed to another anchor to minimize propagation of errors in the positions of the set of sensors.

18 Claims, 4 Drawing Sheets

100

METHOD AND NETWORK FOR DETERMINING POSITIONS OF WIRELESS NODES WHILE MINIMIZING PROPAGATION OF POSITIONING ERRORS

FIELD OF THE INVENTION

This invention relates generally to wireless communication, and more particularly to ranging and positioning in wireless networks of nodes.

BACKGROUND OF THE INVENTION

Public, medical, commercial, robotic and military applications can be enhanced with static or mobile wireless sensor nodes (sensors for sensing an environment and transceivers for communicating sensed data). In many such applications, accurate positioning of the nodes is an important task. As used herein, the term positioning means to determine the coordinates or locations of the nodes.

Accurate positioning needs to deal with varying propagation delays in wireless channels, as well as software and hardware design limitations. A Global positioning system (GPS) can provide acceptable accuracies outdoors. Indoors, the accuracies of the GPS is severely degraded by multipath propagation, and a probability of non-line of sight (NLOS) conditions because the GPS needs to have LOS to at least four GPS satellites.

Distributed positioning methods iteratively determine a ranging estimate by sharing range and position information among nodes using either direct ranging (DR) or extended ranging (ER). The distinction is based on the method used to estimate distance between anchor nodes (anchors) at known positions, and sensor node (sensors) at unknown positions.

In DR, the sensor only obtains direct range estimates to anchors. When the sensor has range measurements to three or four anchors, it is possible to obtain a two- or three-dimensional position estimate for the sensor. Then, the sensor can be transformed to another anchor.

In ER, the sensors estimate the distances between each other and a set of anchors. The sensors obtain the distance estimate through a variety of methods, including counting the number of hops along the wireless route to the anchors, measuring the distances to the anchors, and adding all distances of the route, or obtain a geometric estimate of the distance by relying on the relative position of adjacent nodes.

DR is more accurate because the range error between nodes is measured directly and thus positioning error propagation is minimized. However, DR requires a minimum anchor node density.

ER is less accurate because the distance to an anchor is not always directly measured. Instead, some distances are estimated by either the number of hops or geometric estimation. Although ER has less stringent density requirements, positioning error propagation is a problem. Location estimations of nodes further away from the anchor nodes generally have more error than the nodes that are in direct communication contact with the anchor nodes.

It is desired to minimize positioning error propagation while performing extended ranging.

SUMMARY OF THE INVENTION

The embodiments of the invention provide an iterative and distributed method for minimizing positioning error propagation in a wireless sensor network (WSN). The method integrates and uses weighted quality information for ranging estimates and position estimates to minimize local errors during each iterative step.

The WSN includes an initial set of anchors at known locations, and a set of sensors at unknown locations. Ranges, from each sensor to at least three of the anchors, determine a position, an anchor ranging weight, and an anchor position weight.

For each anchor, the anchor ranging weight and the anchor position weight form a combined weight. A weighted least square (WLS) function for the positions and the combined weights is minimized to determine a position of the sensor, and a sensor position weight.

The sensor is identified as being a member of a set of candidate anchor nodes, and the candidate anchor node with a largest sensor position weight is selected to be transformed to another anchor to minimize propagation of errors in the positions of the set of sensors.

DETAILED DESCRIPTION OF THE PREFERRED EMBODIMENT

Figure 1:
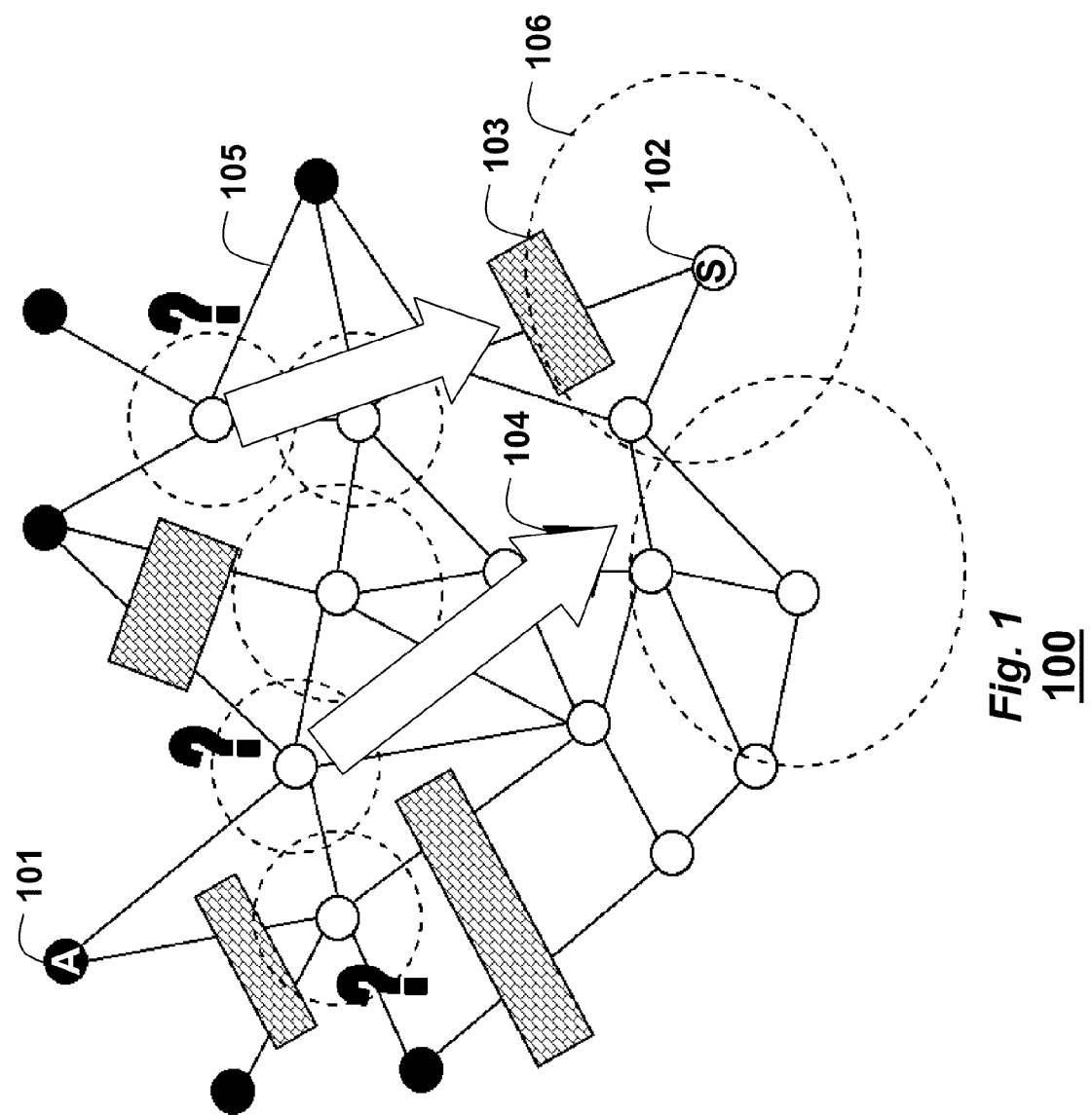
FIG. 1 is a schematic of a wireless sensor network according to embodiments of the invention.

FIG. 1 shows a wireless sensor network (WSN) 100 according to embodiments of our invention. The WSN includes an initial set of M anchor nodes (anchors A) 101 at known positions, and a set of N sensor nodes (sensors S) 102 at unknown positions indicated by "?." The nodes are connected by wireless links 105. Some of the links are subject to barriers 103 in line-of-sight (LOS) channels. The large arrows 104 generally indicate directions in which position information is propagated through the WSN. The dashed circles 106 approximately indicate a sensing range for the various nodes 101-102.

The initial anchor nodes can be different than sensor nodes. For example, the anchor nodes are transceivers permanently placed at strategic known locations in a particular environment to facilitate our node positioning. In addition, the initial anchor nodes can have a greater transmit power and receive sensitivity then the sensor nodes to maximize ranging coverage.

The sensor nodes can be mobile, and battery operated at reduced power and transmission range compared to the initial anchor nodes.

We estimate coordinates $\hat{\theta}_n = (\hat{x}_n, \hat{y}_n)^T$ of the sensor nodes 102 at unknown positions from the coordinates $\theta_m = (x_m, y_m)^T$ of the anchor nodes 101 at the known positions, where m $\in [-M, 0]$ and n $\in [1, N]$ respectively. Herein, the symbol "^" means an estimate.

The nodes 101-102 cooperate to estimate the coordinates of the sensors 102. In two-way time-of-arrival (TOA) ranging, a distance between a transmitter and a receiver is estimated as the time for the ranging signal to make the round trip divided by two and multiplied by the speed of electromagnetic wave in free space. In received-signal-strength (RSS) based ranging, a distance between the transmitter antenna and receiver antenna can be estimated based on the estimated path-loss.

In distributed cooperative positioning, sensors that are within direct range of at least 3 or 4 anchors can estimate their 2- or 3-dimensional position, and then assist other sensors in their positioning processes. This iterative, distributed, and cooperative positioning has two major challenges.

The first is inherit in the ranging technology and its performance in a given propagation environment. A TOA-based ranging can be significantly degraded in non-LOS (NLOS) environments due to biased estimates that ultimately degrade the positioning performance. A RSS-based ranging can also be significantly degraded in NLOS environment or deep fading channels. Second, the positioning errors can be propagated in a distributed method due to ranging errors, and the geometry and density of the network.

Some sensors experience ranging errors on some of the links due to the LOS barriers 103 and geometrical constraints, which results in a degree of uncertainty in their position estimates. As the sensors transform into anchors, the error in their position is propagated to other nodes in the network, along with the ranging and geometry errors. Eventually, if there is no control, the positioning errors are significantly compounded, making the estimates at distances essentially useless.

In general, the WSN has R range measurements, which can be corrupted by different range errors. In a distributed positioning approach, the corrupted range measurements can impact the accuracy of the position during each iteration.

Formally, a TOA based estimate of the range between the $i^{th}$ and the $j^{th}$ nodes is $\hat{\tau}_{ij}\tau_{ij}+\zeta_{ij}$, where $\tau_{ij}$ is an actual range between the nodes, and $\zeta_{ij}$ is a corrupting error. Typically, the range is expressed in terms of a range distance $$\hat{d}_{ij}=d_{ij}+z_{ij}+\epsilon_{ij},$$

where $d_{ij}=v\tau_{ij}$ is the distance between the nodes i and j, v is a speed of signal propagation, $d_{ij}=\sqrt{(x_i-x_j)^2+(y_i-y_j)^2}$, $z_{ij}$ is a zero mean measurement error, and $\epsilon_{ij}$ is a ranging error. For LOS ranging, we assume the ranging error $\epsilon_{ij}$ is zero.

We provide a method that operate at ranging and distributed positioning levels. At the ranging level, NLOS conditions are identified, and the impact of the corresponding erroneous ranging data are reduced to minimize the propagation of positioning errors. At the distributed positioning level, error propagation is minimizing at each node, and during sensor-to-anchor transformations.

Distributed Cooperation Positioning while Minimizing Propagation of Positioning Errors The effect of the radio frequency (RF) propagation channel on the TOA estimation is always a problem, whether outdoors or indoors, although indoors, the problem is more likely to occur. The problem is even more challenging for iterative distributed methods, where the range errors affecting a single node also directly impact subsequent positioning performance at other nodes, and eventually, the entire WSN. Therefore, we assess and quantify the quality of the TOA-based ranges to be integrated into the position estimation, and transform sensors to anchors accordingly.

Figure 2B:
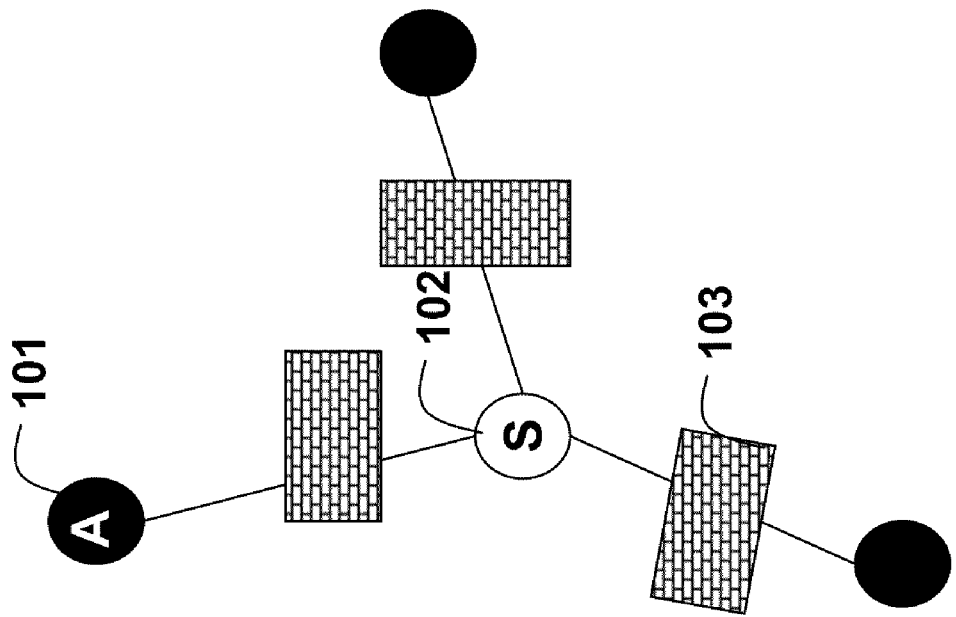
FIG. 2B is a schematic of a wireless sensor network without GDOP but with NLOS ranging data.
Figure 2A:
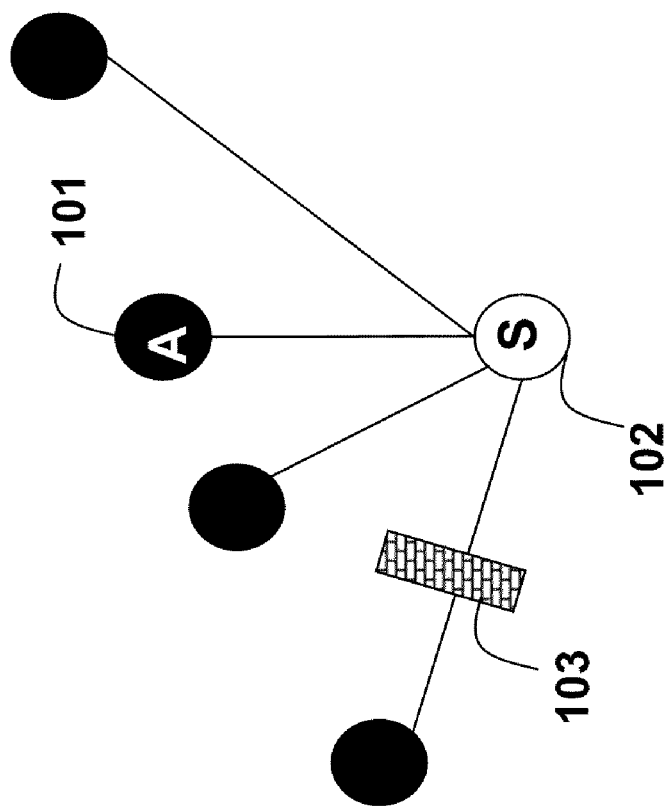
FIG. 2A is a schematic of a wireless sensor with substantial geometric dilution of precision (GDOP) but with LOS ranging data.

FIGS. 2A-2B illustrate the concept of the quality of ranging measurements. In FIG. 2A, the sensor 102 has range measurements to three anchor nodes 101, of which at least three are LOS range measurements, and one is possibly a corrupted NLOS range measurement due to the LOS barrier 103. Because nodes are linearly arranged, they have substantial Geometric Dilution of Precision (GDOP).

In FIG. 2B, the sensor 102 has a better GDOP, however, all three range measurements have large errors due NLOS channels.

In the WSN 100, each sensor 102 estimates its position by ranging to K anchors 101, where K is at least 3 or 4 for two- and three-dimensional positioning.

For each sensor node, an anchor is associated with a range weight and a position weight $\{w_k^{TOA}, w_k^{POS}\}$, where $k\in[1, K]$. The weights quantify the quality of the range and position values of each anchor.

The anchor ranging weight $w^{TOA}$ can be determined using various channel condition classification methods that quantify the quality of the channel. The anchor position weight $w^{POS}$ is a quantitative quality of the anchor position estimate.

Channel Classification

Several channel condition classification methods are known.

Channel statistics, such as root mean square (RMS) delay spread, can be used to identify NLOS channels. That method is computationally complex, and energy inefficient, because multiple range measurements are needed per channel to determine the channel statistics.

Frequency diversity can also be used to identify NLOS channels. Based on channel measurements in a typical indoor environment, the variation of time-of-arrival (TOA) estimation, across different frequency sub-bands, has a positive correlation with the channel condition. That approach requires a frequency hopping capable radio frequency (RF) transmitter end, which increases cost, complexity, and power consumption. It is also difficult to isolate the frequency dependency of the antennas from the channel, which directly impacts the effectiveness of that approach.

Running variance is another method for channel condition identification. That method computes the variance of subsequent range estimates, and compares the variances with a predetermined threshold to detect LOS and NLOS channels. That method has a high computation complexity, and is energy inefficient.

A change of signal-to-noise (SNR) method detects sudden change of the SNR to determine whether the channel is changing between LOS and NLOS.

Joint TOA/RSS (received signal strength) method detects the conditional probability that whether a channel is LOS or NLOS given both the TOA and received signal strength estimation.

The estimated coordinates $\hat{\theta}_n=(\hat{x}_n, \hat{y}_n)^T$ of the sensor n are determined by minimizing a weighted least square (WLS) regression function $$E[\hat{\theta}]=[\hat{d}-F(\hat{\theta})]^T W[\hat{d}-F(\hat{\theta})],$$

where $\hat{d}$ is the range measurement vector to the anchors 102, $F(\hat{\theta})$ is a vector of estimated distances $$F(\hat{\theta})=[(\hat{x}-\hat{x}_1)^2+(\hat{y}-\hat{y}_1)^2, \ldots, (\hat{x}-\hat{x}_K)^2+(\hat{y}-\hat{y}_K)^2]^T,$$

where $(\hat{x}_k, \hat{y}_k)^T$ are the coordinates of the $k^{th}$ anchor, and T denotes the transpose operation. The coordinates are exact for the initial anchors in the set, but can be corrupted for candidate anchors that were transformed from sensors.

A diagonal matrix $W=\text{diag}(\psi_1, \ldots, \psi_K)$ stores the weights $\psi_i$ that combine the range and position weights $\{w_k^{TOA}, w_k^{POS}\}$, for the anchor k.

Then, the position of the sensor node can be obtained by evaluating a linearizing cost function $$\hat{\theta}=\theta_0+(H^T W H)^{-1} H^T W[\hat{d}-F(\theta_0)],$$

where $\theta_0$ is an initialization linearization point, and H is a Jacobian matrix of the distance vector F.

Our method is iterative and distributed. The method performs range and position weighting by incorporating the confidence or quality of the estimates.

Figure 3:
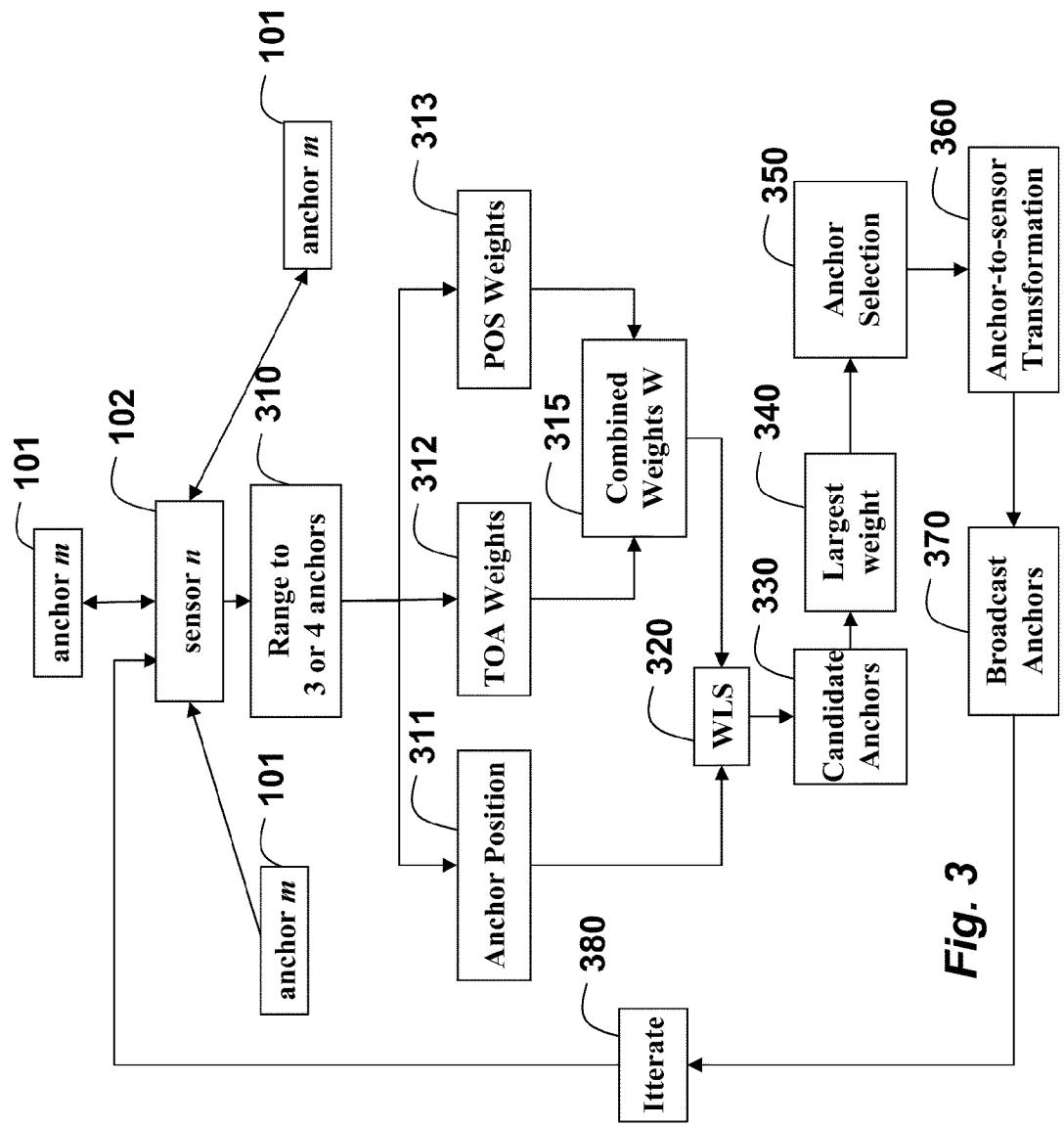
FIG. 3 is a flow diagram of a method for localizing sensor nodes according to embodiments of the invention.

As shown in FIG. 3, during each iteration 380, a sensor n 102 performs TOA ranging 310 using a ranging module to at least three or four anchors 101 to obtain positions 311 of the anchors, the anchor ranging weights $w^{TOA}$ 312, and the anchor position weights $w^{POS}$ 313. A combiner combines weights W 315 to provide a quantitative measure of the quality of the estimates. As the range and position quality deteriorate, we decrease the weights to minimize the impact on the estimation. We achieves this objective by linearly combining the range and position weights of the $k^{th}$ anchors as $$\psi_k = \frac{1}{(1/w_k^{TOA}) + (1/w_k^{POS})}.$$

One indicator of the quality (weight $w_n^{POS}$) of position estimation is the inverse of the covariance of position estimates as $$w_n^{POS} = \frac{1}{\text{trace }(C_n)},$$

where trace the sum of the elements on the main diagonal of the covariance matrix $C_n=(H^T w^{-1} H)^{-1}$ of the position coordinates $\hat{\theta}_n=(\hat{x}_n, \hat{y}_n)^T$. This implies a larger covariance of the position yields a lower confidence or position weight.

Then, the WLS 320 determines the coordinates $\hat{\theta}_n=(\hat{x}_n, \hat{y}_n)^T$ of the node n, and the position weight $w_n^{POS}$ for the sensor n.

After the sensor estimates the coordinates $\hat{\theta}_n=(\hat{x}_n, \hat{y}_n)^T$ of its position, and the corresponding sensor position weight $w_n^{POS}$, the sensor becomes a member of the set of candidate anchors 330.

For each iteration, the candidate anchor with the largest confidence or sensor position weight 340 is selected 350 to be transformed 360 from sensor to anchor. In a large WSN, there can be multiple disjoint sets candidate anchors as position data are propagated. Therefore, a given iteration might involve several sensor-to-anchor transformations 360.

Then, the newly transformed (t) anchor updates its status ID from sensor to anchor, and broadcasts 370 the coordinates $\hat{\theta}_t=(\hat{x}_t, \hat{y}_t)^T$ of its position, and the sensor position weight $w_t^{POS}$. This process iterates 380 until all sensors are transformed to anchors. In this way, the propagation error is minimized throughout the entire WSN.

EFFECT OF THE INVENTION

The invention determines reliable and accurate positions of nodes in a wireless sensor network, particular if the positions are determined in an iterative and distributive manner. The positioning method assesses the quality of range estimates, and integrates range information to obtain accurate position estimates and reduce position error propagation by assigning confidence metrics to the position information.

Figure 4:
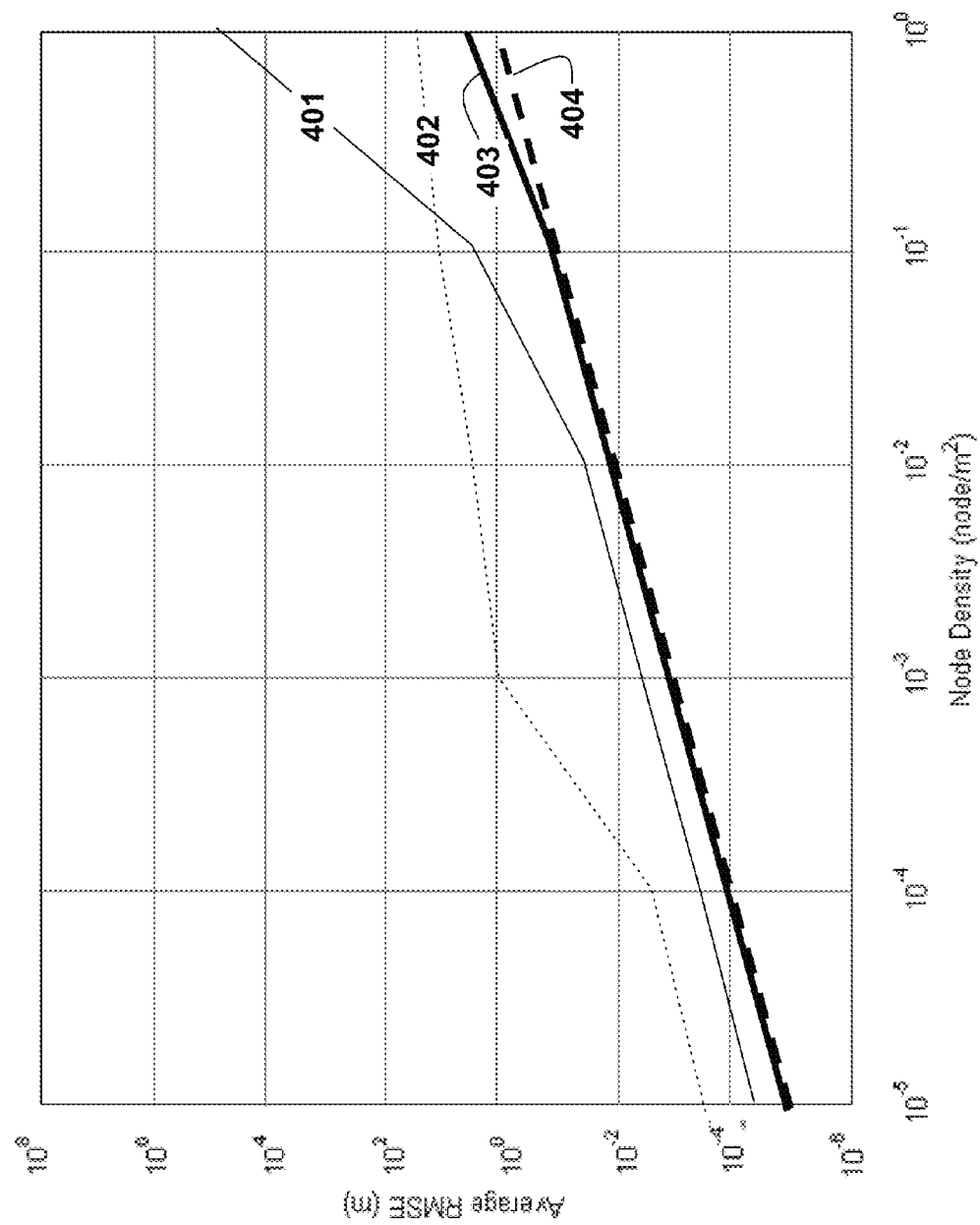
FIG. 4 is a graph comparing performance of prior art methods with the method according to embodiments of the invention, and ideal performance.

FIG. 4 is a graph comparing average root mean square error (RSME) in meters (m), as a function of node density for some conventional methods without anchor selection 401, with anchor selection 402, and the present method 403, which operates near the ideal Cramér-Rao lower bound (CRLB) 404 on the variance of estimators.

In conventional WSN with over 100 nodes, positioning information beyond 80 meters the initial anchors has significant positioning errors, and is essentially useless. The invention solves this problem.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for determining positions of nodes in a wireless sensor network (WSN), wherein the WSN includes an initial set of anchor nodes (anchors) at known locations, and a set of sensor nodes (sensors) at unknown locations, and wherein each sensor node includes a transceiver and a processor for performing steps of the method, comprising for each sensor node:
    estimating ranges to at least three of the anchors to determine, for each anchor, a position, an anchor ranging weight, and an anchor position weight;
    combining, for each anchor, the anchor ranging weight and the anchor position weight into a combined weight;
    minimizing a weighted least square (WLS) function for the positions and the combined weights of the at least three anchors to determine a position of the sensor, and a sensor position weight;
    identifying the sensor as being a member of a set of candidate anchor nodes; and
    selecting the candidate anchor node with a largest sensor position weight to be transformed to another anchor to minimize propagation of errors in the positions of the set of sensors.

2. The method of claim 1, wherein only the sensor nodes include sensors configured to sense an environment.

3. The method of claim 1, wherein the initial anchors have a greater transmit power and receive sensitivity then the sensors to maximize coverage.

4. The method of claim 1, wherein the initial anchor nodes are permanently placed.

5. The method of claim 1, wherein channels between the anchors and the sensors include line of sight barriers.

6. The method of claim 1, wherein a time of arrival based estimate between two node i and j is $\hat{\tau}_{ij}=\tau_{ij}+\zeta_{ij}$, where $\tau_{ij}$ is an actual range between the two nodes, and $\zeta_{ij}$ is a corrupting error, wherein "^" means an estimate.

7. The method of claim 1, wherein a diagonal matrix $W=\text{diag}(\psi_1, \ldots, \psi_K)$ stores weights $\psi_i$ that combine the range weight and position weight $\{w_i^{TOA}, w_i^{POS}\}$, for the anchor i.

8. The method of claim 7, wherein range is expressed as a distance estimate $$\hat{d}_{ij}=d_{ij}+z_{ij}+\epsilon_{ij},$$

where $d_{ij}=v\tau_{ij}$ is a distance between the two nodes i and j, v is a speed of signal propagation, $d_{ij}=\sqrt{(x_i-x_j)^2+(y_i-y_j)^2}$, $z_{ij}$ is a zero mean measurement error, and $\epsilon_{ij}$ is a ranging error.

9. The method of claim 1, wherein the anchor ranging weight and the anchor position weights for each anchor k are $\{w^{TOA}, w^{POS}\}$.

10. The method of claim 9, wherein the ranging weight $w^{TOA}$ depends on channel statistics.

11. The method of claim 9, wherein the ranging weight $w^{TOA}$ depends on frequency diversity.

12. The method of claim 9, wherein the ranging weight $w^{TOA}$ depends on a running variance.

13. The method of claim 9, wherein the ranging weight $w^{TOA}$ depends on a change of signal-to-noise (SNR).

14. The method of claim 9, wherein coordinates of the position of sensor n are $\hat{\theta}_n=(\hat{x}_n, \hat{y}_n)^T$, and the WLS position estimation is given as $$E[\hat{\theta}]=[\hat{d}-F(\hat{\theta})]^T W[\hat{d}-F(\hat{\theta})],$$

where $\hat{d}$ is a range measurement vector to the anchors, a vector of estimated distances is $$F[\hat{\theta}]=[(\hat{x}-\hat{x}_n)^2+(\hat{y}-\hat{y}_1)^2, \ldots, (\hat{x}-\hat{x}_K)^2+(\hat{y}-\hat{y}_K)^2]^T,$$

where $(\hat{x}_k, \hat{y}_k)^T$ are coordinates of the $k^{th}$ anchor, and T is a transpose operator.

15. The method of claim 14, further comprising: evaluating a linearizing cost function $$\hat{\theta}=\theta_0+(H^T W H)^{-1} H^T W[\hat{d}-F(\theta_0)],$$

where $\theta_0$ is an initialization linearization point, and H is a Jacobian matrix of the distance vector F.

16. The method of claim 15, wherein the combined weight is $$\psi_k = \frac{1}{(1/w_k^{TOA})+(1/w_k^{POS})}.$$

17. The method of claim 16, wherein $$w_n^{POS} = \frac{1}{\text{trace }(C_n)},$$

where trace sums the elements on a main diagonal of a covariance matrix $C_n=(H^T w^{-1} H)^{-1}$ of coordinates $\hat{\theta}_n=(\hat{x}_n, \hat{y}_n)^T$.

18. A wireless sensor network (WSN) including an initial set of anchor nodes (anchors) at known locations and a set of sensor nodes (sensors) at unknown locations, and wherein each sensor node includes a transceiver, and a processor, comprising at each sensor node:
- a ranging module for estimating ranges to at least three of the anchors to determine, for each anchor, a position, an anchor ranging weight, and an anchor position weight;
- a combiner configured to combine, for each anchor, the anchor ranging weight and the anchor position weight into a combined weight;
- means for minimizing a weighted least square (WLS) function for the positions and the combined weights of the at least three anchors to determine a position of the sensor, and a sensor position weight;
- means for identifying the sensor as being a member of a set of candidate anchor nodes; and
- means for selecting the candidate anchor node with a largest sensor position weight to be transformed to another anchor to minimize propagation of errors in the positions of the set of sensors.

\* \* \* \* \*